(12) United States Patent
Robinson et al.

(10) Patent No.: US 11,367,082 B2
(45) Date of Patent: Jun. 21, 2022

(54) SYSTEMS, METHODS, AND STORAGE MEDIA FOR PROVIDING INFORMATION RELATING TO SUSPICIOUS FINANCIAL ACTIVITIES TO INVESTIGATIVE AGENCIES

(71) Applicant: Hummingbird RegTech Inc., Walnut, CA (US)

(72) Inventors: Joseph Loree Robinson, San Francisco, CA (US); Jesse Lee Reiss, Berkeley, CA (US); Ryan Thomas Gerard, San Francisco, CA (US); Matthew Van Buskirk, Washington, DC (US)

(73) Assignee: HUMMINGBIRD REGTECH INC., Walnut, CA (US)

( * ) Notice: Subject to any disclaimer, the term of this patent is extended or adjusted under 35 U.S.C. 154(b) by 268 days.

(21) Appl. No.: 16/573,188

(22) Filed: Sep. 17, 2019

(65) Prior Publication Data

US 2021/0081960 A1    Mar. 18, 2021

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/00* | (2012.01) |
| *G06F 9/54* | (2006.01) |
| *G06Q 50/26* | (2012.01) |
| *H04L 9/40* | (2022.01) |

(52) U.S. Cl.
CPC ......... *G06Q 30/0185* (2013.01); *G06F 9/547* (2013.01); *G06Q 50/26* (2013.01); *H04L 63/10* (2013.01)

(58) Field of Classification Search
CPC .... G06Q 30/0185; G06Q 50/26; G06Q 40/00; G06F 9/547; H04L 63/10
USPC .................................................. 705/1.1–912
See application file for complete search history.

(56) References Cited

U.S. PATENT DOCUMENTS

| | | | |
|---|---|---|---|
| 8,751,399 B2 | 6/2014 | Kolhatkar et al. | |
| 9,058,581 B2 * | 6/2015 | Lawrence | G06Q 40/08 |
| 10,163,158 B2 * | 12/2018 | Song | G06Q 20/4016 |

(Continued)

OTHER PUBLICATIONS

European Patent Office, Extended Search Report for European Application No. 20193230 8 dated Dec. 16, 2020.

*Primary Examiner* — Jonathan P Ouellette
(74) *Attorney, Agent, or Firm* — Rimon PC; Marc Kaufman

(57) ABSTRACT

Systems, methods, and storage media for providing information relating to suspicious financial activities to investigative agencies are disclosed. Exemplary implementations may: receive a digital access token from a financial institution; cause an application programming interface to be displayed on a computing device corresponding to the financial institution in response to receipt of the digital access token; receive case information from the financial institution create a case corresponding to the access token and the case information; determine one or more relevant investigative agencies for receiving a report based on the case information; retrieve a data model corresponding to each relevant investigative agency; and file a Suspicious Activity Report based on the case information in each of the one or more relevant jurisdictions in correspondence with the access token.

24 Claims, 3 Drawing Sheets

(56) References Cited

U.S. PATENT DOCUMENTS

| | | |
|---|---|---|
| 2004/0215558 A1 | 10/2004 | Morales et al. |
| 2005/0102210 A1* | 5/2005 | Song .................... G06Q 20/108 705/35 |
| 2011/0087495 A1 | 4/2011 | O'Neill et al. |
| 2012/0296692 A1* | 11/2012 | O'Malley .......... G06Q 10/0635 705/7.28 |
| 2014/0317681 A1* | 10/2014 | Shende .................. H04L 63/10 726/1 |
| 2018/0240107 A1 | 8/2018 | Andrade |

* cited by examiner

SYSTEMS, METHODS, AND STORAGE MEDIA FOR PROVIDING INFORMATION RELATING TO SUSPICIOUS FINANCIAL ACTIVITIES TO INVESTIGATIVE AGENCIES

FIELD OF THE DISCLOSURE

The present disclosure relates to systems, methods, and storage media for providing information relating to suspicious financial activities to investigative agencies.

BACKGROUND

"Money laundering", i.e. the process of concealing the origins of money obtained illegally by passing it through a complex sequence of banking transfers or commercial transactions, is a significant problem worldwide. Money laundering is often used by parties to account for the proceeds of their activities without gaining the attention of law enforcement agencies. Law enforcement agencies of many jurisdictions have set up sophisticated systems, and even international cooperative agreements, for detecting suspicious transactions or activities that may be indicative of money laundering or other financial fraud.

A Suspicious Activity Report (SAR) or Suspicious Transaction Report (STR) (referred to collectively as "SAR" herein) is a report made by a financial institution to the appropriate regulatory authorities about suspicious or potentially suspicious activity. In many jurisdictions, filing an SAR is mandatory when the financial institution sees certain specified triggering activities. The criteria to decide when a report must be made varies by jurisdiction, but generally is any financial transaction that does not make sense to the financial institution; is unusual for that particular client; or appears to be done only for the purpose of hiding or obfuscating another, separate transaction. The financial institution is ordinarily not permitted to inform the parties involved in the transaction that a SAR has been filed.

In the United States, SARs must be reported to the Financial Crimes Enforcement Network (FinCEN), an agency of the United States Department of the Treasury. The agency to which a report is required to be filed for a given country is typically part of the law enforcement or financial regulatory department of that country. SARs include detailed information about transactions that appear to be suspicious. The goal of SAR filings is to help the government identify individuals, groups and organizations involved in fraud like terrorist financing, money laundering, and other crimes, for further investigation.

For example, in the United States, FinCEN requires that an SAR be filed by a financial institution when the financial institution suspects insider abuse by an employee; violations of law aggregating over $5,000 where a subject can be identified; violations of law aggregating over $25,000 regardless of a potential subject; transactions aggregating $5,000 or more that involve potential money laundering or violations of the Bank Secrecy Act; computer intrusion; or when a financial institution knows that a customer is operating as an unlicensed money services business. In the US, each SAR generally must be filed within 30 days of the date of the initial determination for the necessity of filing the report. Further, the US Bank Secrecy Act specifies that each firm must maintain records of its SARs for a period of five years from the date of filing. Each country has different requirements. Also, each country has different requirements relating to the triggers for filing an SAR, the type of information that must be reported, the format of the information, the channels of communication, timing requirements and the like. Therefore, filing of an SAR in multiple countries, such as for international transactions, can be a very complicated matter of determining requirements, information, formatting, and timing for each country. Further, there is a level of subjectivity to the requirements of each report depending on the investigator and the specific facts. Therefore, additional information relating to the reported transactions is often required.

SARs are typically received by the investigating authorities as text documents and, for convenience of evaluation and confidentiality reasons, do not include the full extent of potential information relevant to the reported transactions that may be possessed by the financial institution that originated the SAR. Therefore, after reviewing the SAR, the investigative authorities often must contact the reporting financial institutions to obtain more information. Often this requires a judicial subpoena or the like before the information can be obtained. As a result, the information gathering portion of a typical investigation into money laundering or other financial fraud is cumbersome and can create delays.

SUMMARY

One aspect of the present disclosure relates to a system configured for providing information relating to suspicious financial activities to investigative agencies. The system may include one or more hardware processors configured by machine-readable instructions. The processor(s) may be configured to receive a digital access token from a financial institution. The digital access token may identify the financial institution and include a token ID. The processor(s) may be configured to cause an application programming interface (API) to be displayed on a computing device corresponding to the financial institution in response to receipt of the digital access token. The processor(s) may be configured to receive case information, through the API, from the financial institution, the case information including information indicating at least an individual, an institution, and information relating to at least one financial transaction that is to be the subject of a report of suspicious activity to one or more investigative agencies. The processor(s) may be configured to receive additional information from the financial institution relating the case information and storing the additional information in a database in correspondence to the token. The processor(s) may be configured to verify the identity of the financial institution based on the access token. The processor(s) may be configured to create a case corresponding to the access token and the case information. The processor(s) may be configured to determine one or more relevant investigative agencies for receiving a report based on the case information. The processor(s) may be configured to retrieve a data model corresponding to each relevant investigative agency. Each data model may indicate the information required by the corresponding investigative agency for a SAR based on the case information. The processor(s) may be configured to validate that all essential information required by each of the relevant investigative agencies is included in the case information based on each retrieved data model. The processor(s) may be configured to file a SAR based on the case information in each of the one or more relevant jurisdictions in correspondence with the access token.

Another aspect of the present disclosure relates to a method for providing information relating to suspicious financial activities to investigative agencies. The method may include receiving a digital access token from a financial institution. The digital access token may identify the financial institution and include a token ID. The method may include causing an API to be displayed on a computing device corresponding to the financial institution in response to receipt of the digital access token. The method may include receiving case information, through the API, from the financial institution, the case information including information indicating at least an individual, an institution, and a filing relating to at least one financial transaction that is to be the subject of a report of suspicious activity to one or more investigative agencies. The method may include receiving additional information from the financial institution relating the case information and storing the additional information in a database in correspondence to the token. The method may include verifying the identity of the financial institution based on the access token. The method may include creating a case corresponding to the access token and the case information. The method may include determining one or more relevant investigative agencies for receiving a report based on the case information. The method may include retrieving a data model corresponding to each relevant investigative agency. Each data model may indicate the information required by the corresponding investigative agency for a suspicious activity report SAR based on the case information. The method may include validating that all essential information required by each of the relevant investigative agencies is included in the case information based on each retrieved data model. The method may include filing a SAR based on the case information in each of the one or more relevant jurisdictions in correspondence with the access token.

Yet another aspect of the present disclosure relates to a non-transient computer-readable storage medium having instructions embodied thereon, the instructions being executable by one or more processors to perform a method for providing information relating to suspicious financial activities to investigative agencies. The method may include receiving a digital access token from a financial institution. The digital access token may identify the financial institution and including a token ID. The method may include causing an API to be displayed on a computing device corresponding to the financial institution in response to receipt of the digital access token. The method may include receiving case information, through the API, from the financial institution, the case information including information indicating at least an individual, an institution, and a filing relating to at least one financial transaction that is to be the subject of a report of suspicious activity to one or more investigative agencies. The method may include receiving additional information from the financial institution relating the case information and storing the additional information in a database in correspondence to the token. The method may include verifying the identity of the financial institution based on the access token. The method may include creating a case corresponding to the access token and the case information. The method may include determining one or more relevant investigative agencies for receiving a report based on the case information. The method may include retrieving a data model corresponding to each relevant investigative agency. Each data model may indicate the information required by the corresponding investigative agency for a suspicious activity report SAR based on the case information. The method may include validating that all essential information required by each of the relevant investigative agencies is included in the case information based on each retrieved data model. The method may include filing a SAR based on the case information in each of the one or more relevant jurisdictions in correspondence with the access token.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
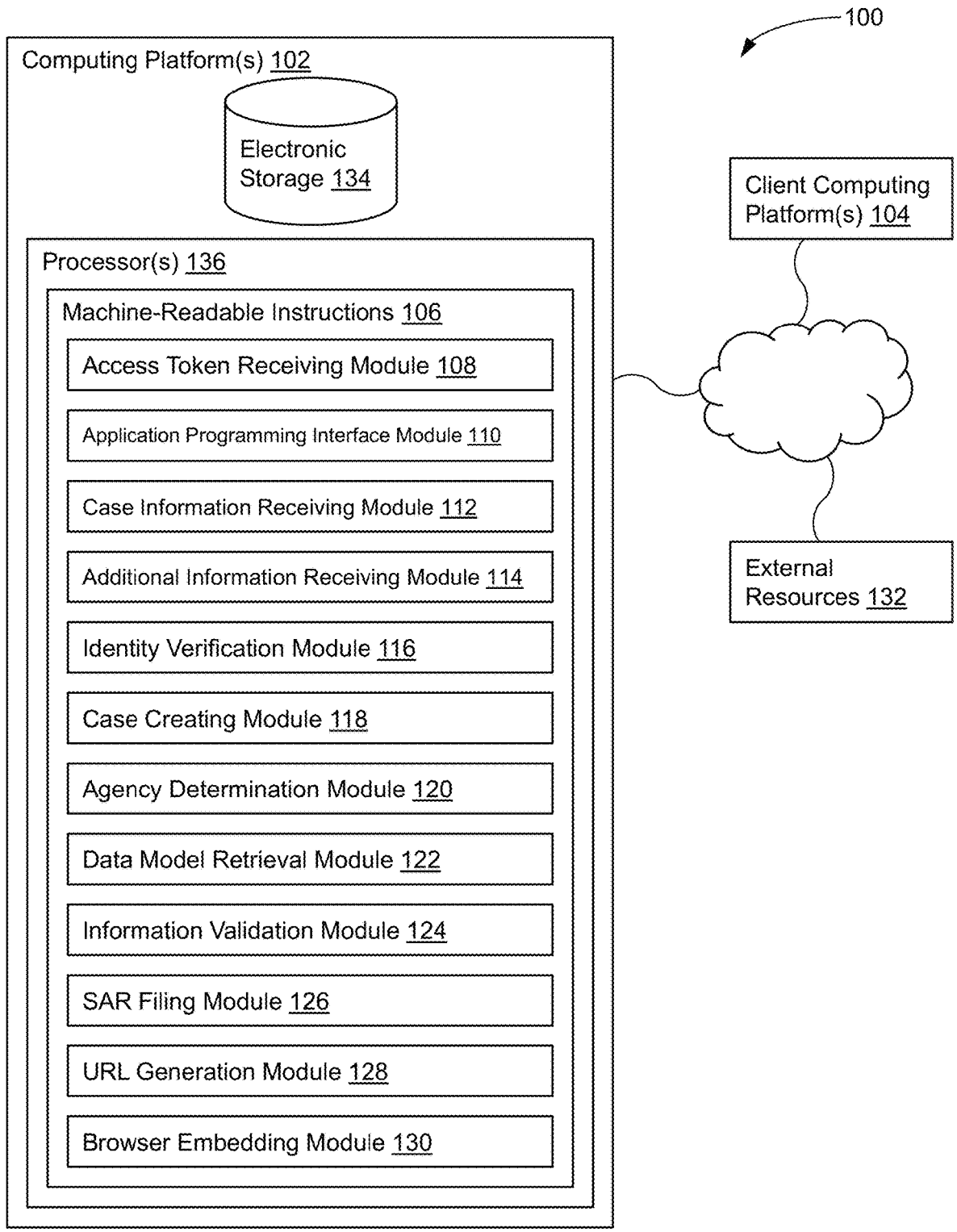
FIG. 1 is a schematic block diagram of a system architecture configured for providing information relating to suspicious financial activities to investigative agencies, in accordance with one or more implementations.

FIG. 1 illustrates a system 100 configured for providing information relating to suspicious financial activities to investigative agencies in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. Client computing platforms may be associated with a financial institution, an investigative agency, or another party participating in the process of filing an SAR and the related investigation.

Server(s) 102 may be configured by machine-readable instructions 106 that are executed by processor(s) 136. Machine-readable instructions 106 may include one or more instruction modules. The instruction modules may include computer program modules. The instruction modules may include one or more of access token receiving module 108, application programming interface module 110, case information receiving module 112, additional information receiving module 114, identity verification module 116, case creating module 118, agency determination module 120, data model retrieval module 122, information validation module 124, SAR filing module 126, URL generation module 128, browser embedding module 130, and/or other instruction modules.

Access token receiving module 108 may be configured to receive a digital access token from a user, a financial institution for example, through a client computing platform 104 for example. The digital access token may identify the financial institution and include a token ID. Users of the system can register an account with Server(s) 102. An access token can be required to make requests to protected operations such as protected parts of the API's discussed below. When establishing and account, server(s) 102 can provide the user with an ID (client_id) and a secret (client_secret). The ID and secret can be used by the user to obtain an access_token. The access_token can be set to expire, within an hour for example, in which case a new token can be requested. Below is a code example that could be used to create the access token.

```
$ cURL -X POST https://API.sandbox.hummingbird.co/oauth/token \
       -H "Content-Type: application/json" \
       -d @- <<EOS
{
    "grant_type": "client_credentials",
    "client_id": "$HUMMINGBIRD_CLIENT_ID",
    "client_secret": "$HUMMINGBIRD_CLIENT_SECRET"
}
EOS
{ "access_token": "<access-token>", ... }
```

Application programming interface module 110 may be configured to cause an application programming interface to be displayed on a computing device, such as client computing device 104 (corresponding to the user such as a financial) in response to receipt of the access token. In some implementations, an access token may be required to make requests to the API.

Case information receiving module 112 may be configured to receive case information, through the API, from the financial institution. The case information can include information indicating at least an individual, a financial institution (the reporting institution for example), and a information relating to at least one financial transaction that is to be the subject of a report of suspicious activity to one or more investigative agencies. A case includes a collection of entities and related information that can be sent to an investigative agency, such as FinCEN. The case entities represent things, such as bank accounts, payment cards and financial institutions.

Additional information receiving module 114 may be configured to receive additional information from the financial institution relating the case information and storing the additional information in a database in correspondence to the token. The additional information can be, stored in electronic storage 134 or external resources 132, for example. By way of non-limiting example, the additional information may include at least one of data visualizations, maps, analysis tools, case data supporting documents, and/or communication tools that enable personnel at the investigative agency to send and receive messages with a compliance professional who prepared the SAR. The external resources storing the additional information can include resources of the financial institution so that the additional information can be maintained securely until requested by an investigative agency as discussed below. Other requirements can apply to release of the additional information, such as a court order or other demonstration of need.

Identity verification module 116 may be configured to verify the identity of the financial institution based on the access token. Case creating module 118 may be configured to create a case data structure corresponding to the access token and the case information. The case information includes investigation information required by the investigative agency. Below is a code example that could be used to create a case data structure including an individual, an institution and a filing (triggering activity). These elements are required for a Suspicious Activity Report for FinCEN.

```
$ cURL -X POST https://API.sandbox.hummingbird.co/cases \
       -H "Authorization: Bearer $HUMMINGBIRD_ACCESS_TOKEN" \
       -H "Content-Type: application/json" \
       -d @- <<EOS
{
    "case": {
        "name": "Test Case 1",
        "type": "filing",
        "individuals": [
            { "names": [ { "name": "Bilbo Baggins", "first_name": "Bilbo", "last_name": "Baggins" } ] }
        ],
        "institutions": [
            {
                "name": "Bank of the Shire",
                "institution_type": "DEPOSITORY_INSTITUTION",
                "primary_federal_regulator": "FDIC",
                "tin": "123123123",
                "tin_type": "EIN"
            }
        ],
        "filings": [
            {
                "filing_type": "INITIAL",
                "jurisdiction": "FINCEN",
                "activities": [
                    "SOURCE_OF_FUNDS"
                ],
                "activity_started_at": "2018-06-10T09:13:34Z",
                "activity_ended_at": "2018-10-10T03:14:15Z",
                "narrative": "Bilbo appears to have quickly accumulated significant wealth."
            }
        ]
    }
}
EOS
{ "case": { "token": "<case-token>", ... } }
```

Agency determination module 120 may be configured to determine one or more relevant investigative agencies for receiving a report based on the case information. For example, the case information can include residential addresses and/or citizenship information of parties which will be automatically parsed to indicate jurisdiction of specific investigative agencies and thus trigger an SAR to be filed in that jurisdiction. The determination can be based on a selection of jurisdictions made by the financial institution.

Data model retrieval module 122 may be configured to retrieve a data model corresponding to each relevant investigative agency. Each data model may indicate the information required by the corresponding investigative agency for a SAR based on the case information.

Figure 3:
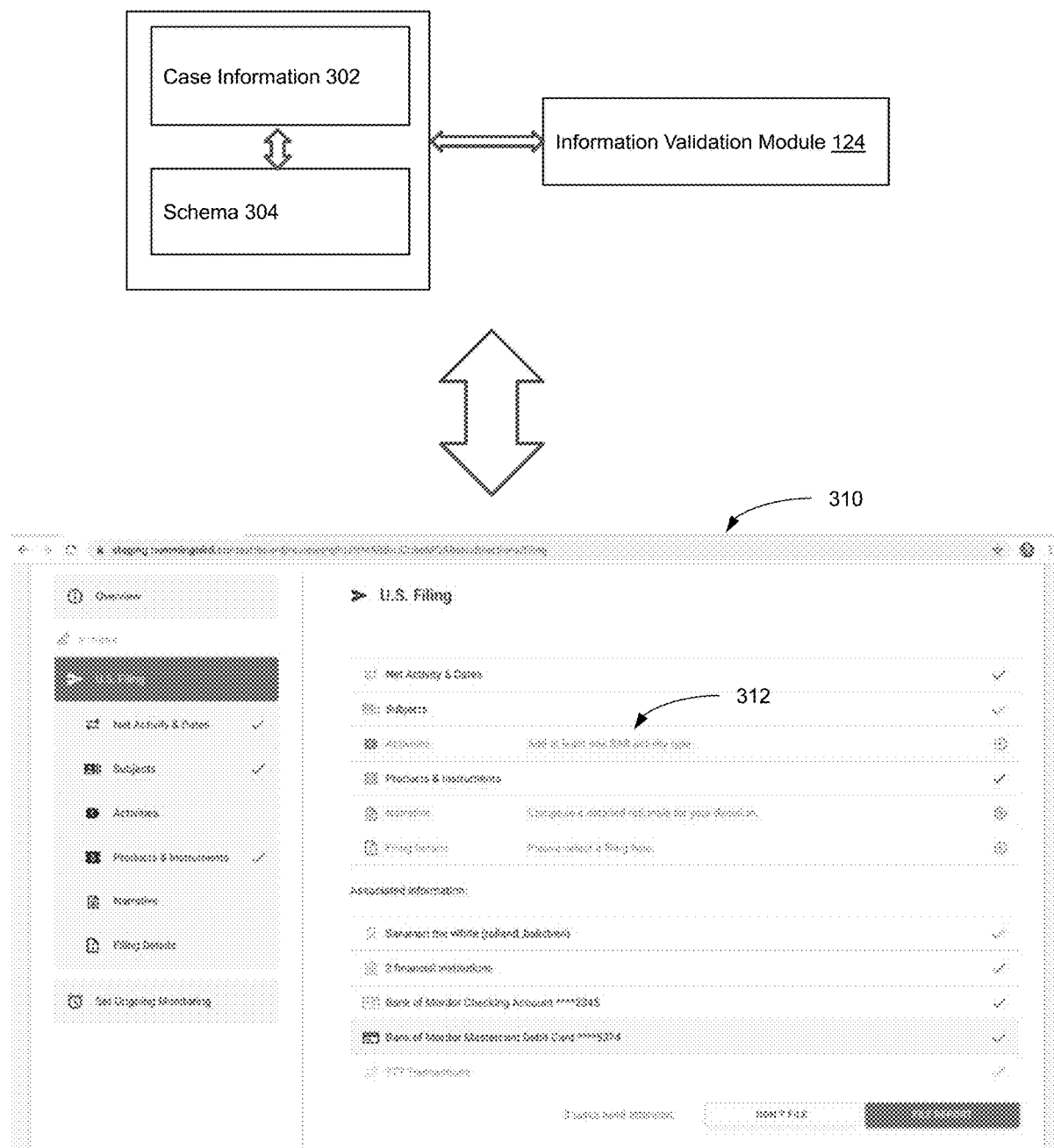
FIG. 3 is block diagram of a data validation process and a user interface (UI) for additional data entry.

Information validation module 124 may be configured to validate that all essential information required by each of the relevant investigative agencies is included in the case information based on each retrieved data model. All information is requested and provided based on an application programming interface (API), which is described in detail below. For example, each data model may specify required and/or optional data. As shown in FIG. 3, Information validation module 124 can compare the case information 302 and related metadata to a schema 304 corresponding to the data model to validate that all required information is included. In some implementations, by way of non-limiting example, each retrieved schema/data model may be based on reporting specifications of the corresponding investigative agency. A validation issues message 312 can be returned, through UI 310, when validation cannot be completed due to missing or incorrect information. Corrected information can be received from the financial institution and the validation can be attempted on the corrected information. The system can run validations against the case with the given token before filing. This can be used as a pre-filing test endpoint to verify that the filing has no known validation errors. Also, an error can be returned if the case does not exist, or if there are other informalities. If all validations are run without error, a success status is returned. As shown in FIG. 3, an ontology for an SAR of a selected jurisdiction can be presented to the user as user interface 310 to prompt the user to enter the required information and can be compared to entered information to indicate additional required information.

SAR filing module 126 may be configured to file a SAR based on the case information in each of the one or more relevant jurisdictions in correspondence with the access token. URL Generation Module 128 can generate and insert a unique system-hosted URL into the SAR filing. URL generation module 128 may be configured to include a secure URL, or other link, in at least one of the SARs. The Secure URL may be an HTTPS URL and use the Secure Sockets Layer (SSL) Protocol. The secure URL may provide the investigative agency with access to the additional information corresponding to the case information. By way of non-limiting example, each secure URL may have controls that include at least one of authentication that the user of the URL is personnel at the investigative agency, a time-based expiration, and/or access permissions to only desired IP addresses. As noted above, other requirements can be applied to use of the secure URL. Each secure URL may be unique to the corresponding SAR and link to additional information based on the requirements of the specific jurisdiction. Various known mechanisms of authenticating that the visitor to the URL is a verified law enforcement agent with permission to access the case data can be used. An expiration date and time can be associated with the secure URL. Further, filtering can be used to enable or prevent IP address ranges from accessing the secure URLs.

Browser embedding module 130 may be configured to embed a link to a secure browser in in the SAR workflow or other message and can be used by investigators at the financial institution or transmitted to at least one of the investigative agencies in connection with SAR for use by the investigative agency. The secure browser may include preset search strategies determined based on the case information. The preset searches can be presented as a button or other UI element in the browser. The preset searches can be configured for each SAR by parsing the information to be reported based on the schema of the jurisdiction and preferences by the submitting party. For example, searches for a US SAR may be focused countries known to be havens for money laundering by US citizens. Examples of such preconfigured searches include:

Search Google with the following query: "[Subject first name] [Subject last name] scam"
   Search Reddit for the following username: "[subject email address username]"
   Ability to search "DarkWeb" sites, also known as TOR sites.

The secure browser may be configured to run on a virtual machine in a client computing platform 104, or another device, controlled by the investigative agency. The virtual machine permits the investigative agency to conduct auditable internet searches that will not later be associated with computing devices of investigative agency. The virtual machine is also a security feature. If a site containing malware or other malicious code is visited using the embedded browser, network safety will not be affected.

Suspicious activity and various financial crime investigations typically include research on the subject(s) of the investigation. This research may include searching for the subject(s) on the public Internet and increasingly on the DarkWeb. Investigators conduct these searches to find the subject(s) profiles on social media networks, activity on forums, message boards, and other types of services. Regulated financial institutions are expected to conduct thorough investigations into unusual, suspicious, and confirmed fraudulent behaviors among their customers. Internet research (including DarkWeb sites) can be a critical component of these investigations. As such, it is important that the financial institution be able to demonstrate that the investigator did conduct the Internet research as part of the investigation.

However, Internet research can be difficult due to characteristics inherent in the modern day worldwide web. For example, search engine providers frequently incorporate personalization algorithms into search result selection and filtering. As a result, the Investigator's search results may be biased by their personal search behaviors and history. Researching subjects on the DarkWeb can be a security risk to the financial institution if proper precautions are not taken. Secure Browser technology can be leveraged to provide secure, safe access to DarkWeb sites. For example, a browser can utilize secure methods of network communication such as DNSSec and DNSCrypt, for example. Further HTTPS and SPDY can be used with digitally signed public key certificates or Extended Validation Certificates. The implementations can embed a secure browser directly into the case workflow. Research conducted in this browser can recorded for future audit, and search results may be added to the case information and/or the additional information.

The browser technology provided for this research avoids bias from personalization algorithms. Additionally, the browser is securely separated from the financial institutions network so that DarkWeb sites may be visited for research purposes. The secure browser can include be an embedded, functionality-controlled Internet and DarkWeb browser provided within the context of a financial compliance case management and workflow service.

The secure browser can run on a virtual machine (VM) with real-time interaction for the investigator. This feature enables the investigator to search the DarkWeb and other risky websites without risk of infecting the financial institution's computers or network with viruses or malware. The ability to screenshot the browser and add the images to the investigation data can be included. Further, the ability to record, view, and share Internet research sessions that have been conducted as part of an investigation can be included.

IP addresses can be purged from the secure browser after searching/browsing sessions of the session. Other tracking data, such as cookies and the like, can also be cleared to obfuscate the identity of the searcher. Further, the entire VM can be spun down to hide the identity of the searcher.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s)

102, client computing platform(s) 104, and/or external resources 132 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination.

Processor(s) 136 may be configured to execute modules 108, 110, 112, 114, 116, 118, 120, 122, 124, 126, 128, and/or 130, and/or other modules. Processor(s) 136 may be configured to execute modules 108, 110, 112, 114, 116, 118, 120, 122, 124, 126, 128, and/or 130, and/or other modules by software; hardware; firmware; some combination of software, hardware, and/or firmware; and/or other mechanisms for configuring processing capabilities on processor(s) 136. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, and/or 130 are illustrated in FIG. 1 as being implemented within a single processing unit, in implementations in which processor(s) 136 includes multiple processing units, one or more of modules 108, 110, 112, 114, 116, 118, 120, 122, 124, 126, 128, and/or 130 may be implemented remotely from the other modules. The description of the functionality provided by the different modules 108, 110, 112, 114, 116, 118, 120, 122, 124, 126, 128, and/or 130 described below is for illustrative purposes, and is not intended to be limiting, as any of modules 108, 110, 112, 114, 116, 118, 120, 122, 124, 126, 128, and/or 130 may provide more or less functionality than is described. For example, one or more of modules 108, 110, 112, 114, 116, 118, 120, 122, 124, 126, 128, and/or 130 may be eliminated, and some or all of its functionality may be provided by other ones of modules 108, 110, 112, 114, 116, 118, 120, 122, 124, 126, 128, and/or 130. As another example, processor(s) 136 may be configured to execute one or more additional modules that may perform some or all of the functionality attributed below to one of modules 108, 110, 112, 114, 116, 118, 120, 122, 124, 126, 128, and/or 130.

Figure 2:
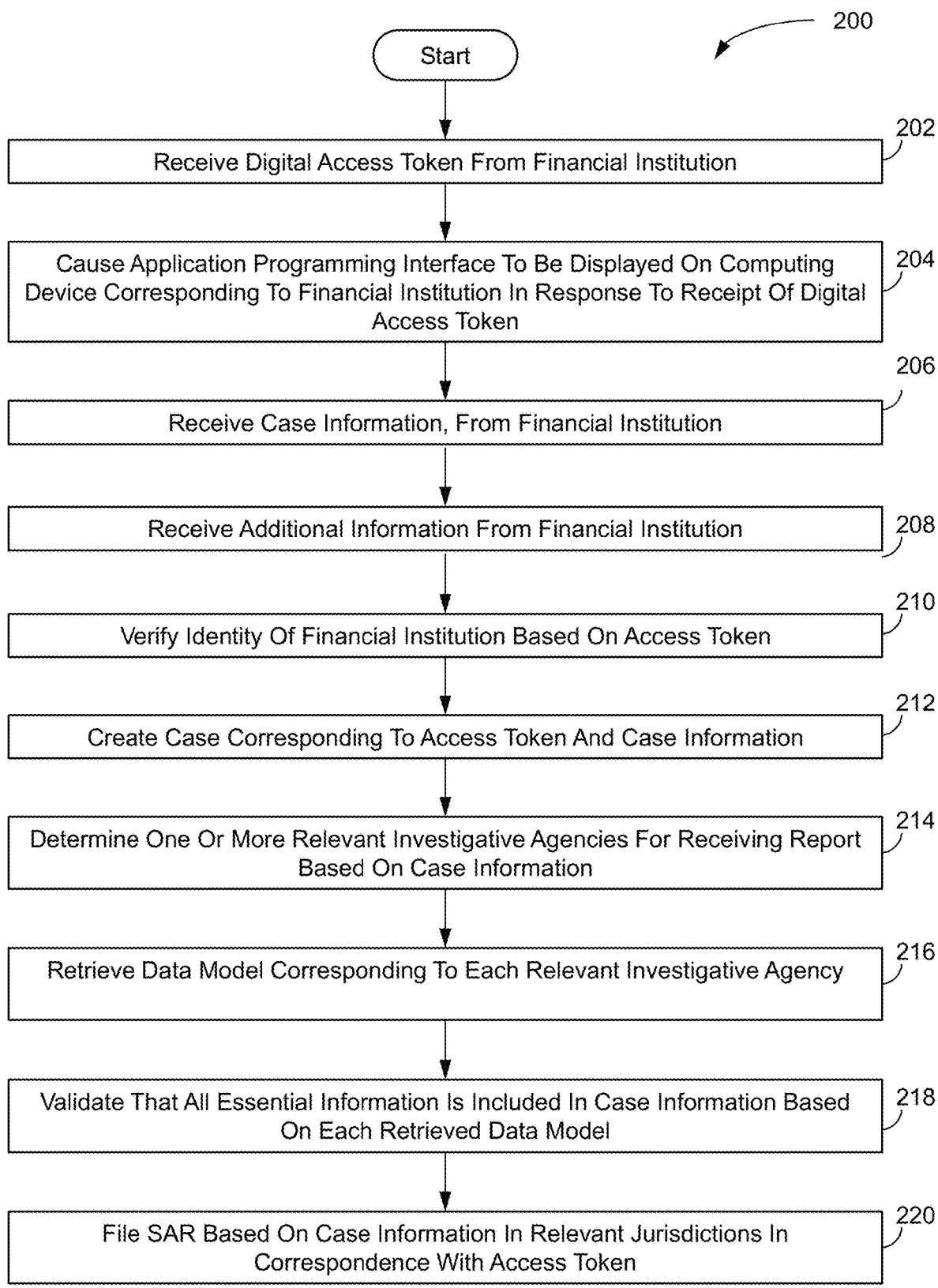
FIG. 2 is a flowchart of a method for providing information relating to suspicious financial activities to investigative agencies, in accordance with one or more implementations.

FIG. 2 illustrates a method 200 for providing information relating to suspicious financial activities to investigative agencies, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a digital access token from a financial institution. The digital access token may identify the financial institution and including a token ID. Operation 202 may be performed by one or more hardware processors configured by machine-readable instructions including a module that is the same as or similar to access token receiving module 108, in accordance with one or more implementations.

An operation 204 may include causing an application programming interface to be displayed on a computing device corresponding to the financial institution in response to receipt of the digital access token. Operation 204 may be performed by one or more hardware processors configured by machine-readable instructions including a module that is the same as or similar to application programming interface causing module 110.

An operation 206 may include receiving case information, through the API, from the financial institution, the case information including information indicating at least an individual, an institution, and information relating to at least one financial transaction that is to be the subject of a report of suspicious activity to one or more investigative agencies. Operation 206 may be performed by one or more hardware processors configured by machine-readable instructions including a module that is the same as or similar to case information receiving module 112.

An operation 208 may include receiving additional information from the financial institution relating the case information and storing the additional information in a database in correspondence to the token. Operation 208 may be performed by one or more hardware processors configured by machine-readable instructions including a module that is the same as or similar to information receiving module 114.

An operation 210 may include verifying the identity of the financial institution based on the access token. Operation 210 may be performed by one or more hardware processors configured by machine-readable instructions including a module that is the same as or similar to identity verification module 116, in accordance with one or more implementations.

An operation 212 may include creating a case corresponding to the access token and the case information. Operation 212 may be performed by one or more hardware processors configured by machine-readable instructions including a module that is the same as or similar to case creating module 118.

An operation 214 may include determining one or more relevant investigative agencies for receiving a report based on the case information. Operation 214 may be performed by one or more hardware processors configured by machine-readable instructions including a module that is the same as or similar to agency determination module 120.

An operation 216 may include retrieving a data model corresponding to each relevant investigative agency. Each data model may indicate the information required by the corresponding investigative agency for a suspicious activity report SAR based on the case information. Operation 216 may be performed by one or more hardware processors configured by machine-readable instructions including a module that is the same as or similar to data model retrieval module 122.

An operation 218 may include validating that all essential information required by each of the relevant investigative agencies is included in the case information based on each retrieved data model. Operation 218 may be performed by one or more hardware processors configured by machine-readable instructions including a module that is the same as or similar to information validation module 124.

An operation 220 may include filing a SAR based on the case information in each of the one or more relevant jurisdictions in correspondence with the access token. Operation 220 may be performed by one or more hardware processors configured by machine-readable instructions including a module that is the same as or similar to SAR filing module 126.

The API can use REST-like semantics and JSON formatting. Therefore, standard HTTP response codes and verbs can be used. Authorization can be achieved using OAuth 2.0. A Client ID and Client Secret can be generated and securely passed to a user. For all objects, the above-noted token can be used as a primary identifier for the resource. In addition, all objects can be annotated with a user internal ID, which may be useful for cross-referencing between objects. X-HB-API-VERSION header values can be used for API versioning. If the value isn't present, the system can default to the latest version of the API. The API versions can be designated by simple positive integers, starting at 1. For added security, IP whitelisting can be used such that API authorization and API calls for can only originate from specific IP addresses and/or ranges associated with a specific user.

As noted above, the implementations provide a common API and underlying schemas that facilitate recessing the information and filing SARs. The schemas include all data required for creating cases, filing SARs and all other processing. An example set of schemas is attached as an Appendix and constitutes part of this specification. The possible values for activities within a filing fall under various categories defined by the SAR specification of each jurisdiction. The values on the left in the tables below are descriptions from the various SARs, and the values on the right are corresponding variable names in an example of the API.

Structuring

| SAR Description | API Value |
| --- | --- |
| Alters or cancels transaction to avoid BSA recordkeeping requirement | ALTERS_TO_AVOID_BSA |
| Alters or cancels transaction to avoid CTR requirement | ALTERS_TO_AVOID_CTR |
| Cancels transaction to avoid BSA recordkeeping requirements | CANCELS_TO_AVOID_BSA |
| Transaction(s) below BSA recordkeeping threshold | MULTIPLE_BELOW_BSA |
| Transaction(s) below CTR threshold | MULTIPLE_BELOW_CTR |
| Suspicious inquiry by customer regarding BSA reporting or recordkeeping requirements | INQUIRY_REGARDING_BSA |

Terrorist Financing

| SAR Description | API Value |
| --- | --- |
| Known or suspected terrorist/terrorist organization | KNOWN_OR_SUSPECTED_ORGANIZATION |

Fraud

| SAR Description | API Value |
| --- | --- |
| ACH | ACH |
| Business loan | BUSINESS_LOAN |
| Check | CHECK |
| Consumer Loan | CONSUMER_LOAN |
| Credit/Debit Card | CREDIT_OR_DEBIT_CARD |
| Healthcase/Public or private health insurance | HEALTHCARE |
| Mail | MAIL |
| Mass-marketing | MASS_MARKETING |
| Ponzi Scheme | PONZI_SCHEME |
| Pyramid scheme | PYRAMID_SCHEME |
| Securities fraud | SECURITIES |
| Wire | WIRE |

Casinos

| SAR Description | API Value |
| --- | --- |
| Inquiry about end of business day | INQUIRY_ABOUT_END_OF_BUSINESS_DAY |
| Minimal gaming with large transactions | MINIMAL_GAMING_LARGE_TRANSACTIONS |
| Chip walking | CHIP_WALKING |
| Transfers | TRANSFERS |
| Suspicious use of counter checks or markers | USE_COUNTER_CHECKS_OR_MARKERS |

Money Laundering

| SAR Description | API Value |
| --- | --- |
| Exchanges small bills for large bills or vice versa | EXCHANGE_BILL_SIZE |
| Funnel account | FUNNEL_ACCOUNT |
| Suspicious concerning the physical condition of funds | PHYSICAL_CONDITION |
| Suspicious concerning the source of funds | SOURCE_OF_FUNDS |
| Suspicious designation of beneficiaries, assignees or joint owners | BENEFICIARIES_ASSIGNEES_OWNERS |
| Suspicious EFT/wire transfers | EFT_OR_WIRE |
| Suspicious exchange of currencies | EXCHANGE_OF_CURRENCIES |
| Suspicious receipt of government payments/benefits | RECEIPT_OF_GOVT_BENEFITS |
| Suspicious use of multiple accounts | USE_OF_MULTIPLE_ACCOUNTS |
| Suspicious use of noncash monetary instruments | USE_OF_NONCASH_INSTRUMENTS |
| Suspicious use of third-party transactors (straw-man) | USE_OF_THIRD_PARTY_TRANSACTOR |
| Trade Based Money Laundering/Black Market Peso Exchange | TRADE_BASED_LAUNDERING |
| Transaction out of pattern for customer(s) | TRANSACTION_OUT_OF_PATTERN |

Identification and Documentation

| SAR Description | API Value |
| --- | --- |
| Changes spelling or arrangement of name | CHANGE_NAME |
| Multiple individuals with same or similar identities | SIMILAR_IDENTITIES |
| Provided questionable or false documentation | QUESTIONABLE_DOCUMENTATION |
| Provided questionable or false identification | QUESTIONABLE_IDENTIFICATION |
| Refused or avoided request for documentation | AVOIDED_DOCUMENTATION_REQUEST |
| Single individual with multiple identities | MULTIPLE_IDENTITIES |

Other Activities

| SAR Description | API Value |
| --- | --- |
| Account takeover | ACCOUNT_TAKEOVER |
| Bribery or gratuity | BRIBERY_OR_GRATUITY |
| Counterfeit Instruments | COUNTERFEIT_INSTRUMENTS |
| Elder financial exploitation | ELDER_EXPLOITATION |
| Embezzlement/theft/disappearance of funds | EMBEZZLEMENT |
| Forgeries | FORGERIES |
| Human smuggling | HUMAN_SMUGGLING |
| Human trafficking | HUMAN_TRAFFICKING |
| Identity theft | IDENTITY_THEFT |

-continued

| SAR Description | API Value |
|---|---|
| Little or no concern for product performance penalites, fees, or tax consequences | NO_CONCERN_FOR_PERFORMANCE |
| Misuse of free period | MISUSE_OF_FREE_PERIOD |
| Misuse of position or self-dealing | MISUSE_OF_POSITION |
| Suspected public/private corruption (domestic) | DOMESTIC_PUBLIC_PRIVATE_CORRUPTION |
| Suspected public/private corruption (foreign) | FOREIGN_PUBLIC_PRIVATE_CORRUPTION |
| Suspicious use of informal value transfer system | INFORMAL_VALUE_TRANSFER |
| Suspicious use of multiple locations | MULTIPLE_TRANSACTION_LOCATIONS |
| Transaction with no apparent economic, business, or lawful purpose | NO_APPARENT_PURPOSE |
| Transaction(s) involving foreign high risk jurisdiction | HIGH_RISK_JURISDICTION |
| Two or more individuals working together | MULTIPLE_INDIVIDUALS |
| Electronic intrusion | ELECTRONIC_INTRUSION |
| Unlicensed or unregistered MSB | UNLICENSED_MSB |

Insurance

| SAR Description | API Value |
|---|---|
| Excessive insurance | EXCESSIVE_INSURANCE |
| Excessive or unusal cash borrowing against policy/annuity | EXCESSIBLE_CASH_BORROWING |
| Proceeds sent to unrelated third party | UNRELATED_THIRD_PARTY |
| Suspicious life settlement sales insurance (e.g., STOLI's, Viaticals) | LIFE_SETTLEMENT_SALES |
| Suspicious termination of policy or contract | TERMINATION_OF_POLICY |
| Unclear or no insurable interest | UNCLEAR_INSURABLE_INTEREST |

Securities and Futures

| SAR Description | API Value |
|---|---|
| Insider trading | INSIDER_TRADING |
| Market manipulation | MARKET_MANIPULATION |
| Misappropriation | MISAPPROPRIATION |
| Unauthorized pooling | UNAUTHORIZED_POOLING |
| Wash trading | WASH_TRADING |

Mortgage Fraud

| SAR Description | API Value |
|---|---|
| Appraisal fraud | APPRAISAL_FRAUD |
| Application fraud | APPLICATION_FRAUD |
| Foreclosure/Short sale fraud | FORECLOSURE_FRAUD |
| Loan Modification fraud | LOAN_MODIFICATION_FRAUD |
| Origination fraud | REVERSE_MORTGAGE_FRAUD |

Product Types

The possible values for product types within a Filing follow the values you see on the SAR itself:

| SAR Description | API Value |
|---|---|
| Bonds/Notes | BONDS_NOTES |
| Commercial mortgage | COMMERCIAL_MORTGAGE |
| Commercial paper | COMMERCIAL_PAPER |
| Credit card | CREDIT_CARD |
| Debit card | DEBIT_CARD |
| Forex transactions | FOREX_TRANSACTIONS |
| Futures/Options on futures | FUTURES_OR_FUTURES_OPTIONS |
| Hedge fund | HEDGE_FUND |
| Home equity loan | HOME_EQUITY_LOAN |
| Home equity line of credit | HELOC |
| Insurance/Annuity products | INSURANCE_OR_ANNUITY |
| Mutual fund | MUTUAL_FUND |
| Options on securities | OPTIONS_ON_SECURITIES |
| Microcap securities | MICROCAP_SECURITIES |
| Prepaid access | PREPAID_ACCESS |
| Residential mortgage | RESIDENTIAL_MORTGAGE |
| Security futures products | SECURITY_FUTURES |
| Stocks | STOCKS |
| Swap, hybrid, or other derivative | OTHER_DERIVATIVES |

Instruments

The possible values for instruments within Filing follow the values you see on the SAR itself:

| SAR Description | API Value |
|---|---|
| Bank/Cashier's check | BANK_OR_CASHIERS_CHECK |
| Foreign currency | FOREIGN_CURRENCY |
| Funds transfer | FUNDS_TRANSFER |
| Gaming instruments | GAMING_INSTRUMENTS |
| Government payment | GOVERNMENT_PAYMENT |
| Money orders | MONEY_ORDERS |
| Personal/Business check | PERSONAL_OR_BUSINESS_CHECK |
| Travelers checks | TRAVELERS_CHECKS |
| U.S. Currency | US_CURRENCY |

Institution Types

The possible values for institution type within an Institution follow the values you see on the SAP, itself:

API Value
CASINO_OR_CARD_CLUB
DEPOSITORY_INSTITUTION
INSURANCE_COMPANY
MSB
SECURITIES_OR_FUTURES
LOAN_OR_FINANCE_COMPANY
HOUSING_GSE.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer system for securely and accurately updating investigative agency records with sensitive information relating to suspicious financial activities to investigative agencies, the system comprising:
   one or more hardware processors configured by machine-readable instructions to:
      receive a digital access token from a financial institution, the digital access token identifying the financial institution and including a token ID;
      cause an application programming interface to be displayed on a computing device corresponding to the financial institution in response to receipt of the digital access token;
      receive case information, through the API, from the financial institution, the case information including information indicating at least an individual, an institution, and information relating to at least one financial transaction that is to be the subject of a report of suspicious activity to one or more investigative agencies;
      receive additional information from the financial institution relating the case information and storing the additional information in a database in correspondence to the token;
      verify the identity of the financial institution based on the access token;
      create a case corresponding to the access token and the case information;
      determine one or more relevant investigative agencies for receiving a report based on the case information;
      for each of the relevant investigative agencies, retrieve a corresponding data model associated with the relevant investigative agency, each corresponding data model indicating a corresponding data set required by the investigative agency for a suspicious activity report (SAR) based on the case information;
      for each of the relevant investigative agencies, validate that all of the corresponding data set is included in the case information based on the corresponding data model;
      for each of the relevant investigative agencies, file a SAR with the investigative agency based on the case information in correspondence with the access token;
      for each of the relevant investigative agencies, determining at least one search strategy based on the case information by parsing the case information based on the corresponding data model of the jurisdiction and configuring preset search strings based on the parsing; and
      transmitting a message to each of the relevant investigative agencies, the message including a link to a secure browser, the secure browser corresponding to the case information and being preconfigured with the preset search strings to thereby permit the investigative agency to conduct auditable internet searches, based on the at least one search strategy, that are not associated with computing devices of investigative agency.

2. The system of claim 1, wherein the one or more hardware processors are further configured by machine-readable instructions to include a secure URL in at least one of the SARs, the secure URL providing the investigative agency with access to the additional information corresponding to the case information.

3. The system of claim 1, wherein each retrieved data model is based on reporting specifications of the corresponding investigative agency and wherein validating further comprises returning a validation issues message when validation cannot be completed due to missing or incorrect information, receiving corrected information, and attempting validation of the corrected information.

4. The system of claim 2, wherein the additional information includes at least one of data visualizations, maps, analysis tools, case data supporting documents, and/or communication tools that enable personnel at the investigative agency to send and receive messages a compliance professional who prepared the SAR.

5. The system of claim 2, wherein each secure URL is unique to the corresponding SAR.

6. The system of claim 5, wherein each secure URL has controls that include at least one of authentication that the user of the URL is personnel at the investigative agency, a time-based expiration, and/or access permissions to only desired IP addresses.

7. The system of claim 1, wherein an access token is required to make requests to the API and the access token expires at a predetermined time.

8. The system of claim 1, wherein the secure browser is configured to run on a virtual machine.

9. A computer implemented method for securely and accurately updating investigative agency records with sensitive information relating to suspicious financial activities to investigative agencies, the method comprising:
   receiving a digital access token from a financial institution, the digital access token identifying the financial institution and including a token id;
   causing an application programming interface to be displayed on a computing device corresponding to the financial institution in response to receipt of the digital access token;
   receiving case information, through the API, from the financial institution, the case information including information indicating at least an individual, an institution, and information relating to at least one financial transaction that is to be the subject of a report of suspicious activity to one or more investigative agencies;

receiving additional information from the financial institution relating the case information and storing the additional information in a database in correspondence to the token;

verifying the identity of the financial institution based on the access token;

creating a case corresponding to the access token and the case information;

determining one or more relevant investigative agencies for receiving a report based on the case information;

for each of the relevant investigative agencies, retrieving a corresponding data model associated with the relevant investigative agency, each corresponding data model indicating a corresponding data set required by the investigative agency for a suspicious activity report (SAR) based on the case information;

for each of the relevant investigative agencies, validating that all of the corresponding data set is included in the case information based on the corresponding data model;

for each of the relevant investigative agencies, filing a SAR with the relevant investigative agency based on the case information in correspondence with the access token;

for each of the relevant investigative agencies, determine at least one search strategy based on the case information by parsing the case information based on the corresponding data model of the jurisdiction and configure preset search strings based on the parsing; and transmit a message to each of the relevant investigative agencies, the mess CA-including a link to a secure browser, the secure browser corresponding to the case information and being preconfigured with the preset search strings to thereby permit the investigative agency to conduct auditable internet searches, based on the at least one search strategy, that are not associated with computing devices of investigative agency.

10. The method of claim 9, further comprising including a secure URL in at least one of the SARs, the secure URL providing the investigative agency with access to the additional information corresponding to the case information.

11. The method of claim 9, wherein each retrieved data model is based on reporting specifications of the corresponding investigative agency and wherein validating further comprises returning a validation issues message when validation cannot be completed due to missing or incorrect information, receiving corrected information, and attempting validation of the corrected information.

12. The method of claim 10, wherein the additional information includes at least one of data visualizations, maps, analysis tools, case data supporting documents, and/or communication tools that enable personnel at the investigative agency to send and receive messages a compliance professional who prepared the SAR.

13. The method of claim 10, wherein each secure URL is unique to the corresponding SAR.

14. The method of claim 13, wherein each secure URL has controls that include at least one of authentication that the user of the URL is personnel at the investigative agency, a time-based expiration, and/or access permissions to only desired ip addresses.

15. The method of claim 9, wherein an access token is required to make requests to the API and the access token expires at a predetermined time.

16. The method of claim 9, wherein the secure browser is configured to run on a virtual machine.

17. A non-transient computer-readable storage medium having instructions embodied thereon, the instructions being executable by one or more processors to perform a method for securely and accurately updating investigative agency records with sensitive information relating to suspicious financial activities to investigative agencies, the method comprising:

receiving a digital access token from a financial institution, the digital access token identifying the financial institution and including a token id;

causing an application programming interface to be displayed on a computing device corresponding to the financial institution in response to receipt of the digital access token;

receiving case information, through the API, from the financial institution, the case information including information indicating at least an individual, an institution, and information relating to at least one financial transaction that is to be the subject of a report of suspicious activity to one or more investigative agencies;

receiving additional information from the financial institution relating the case information and storing the additional information in a database in correspondence to the token;

verifying the identity of the financial institution based on the access token;

creating a case corresponding to the access token and the case information;

determining one or more relevant investigative agencies for receiving a report based on the case information;

for each of the relevant investigative agencies, retrieving a corresponding data model associated with the relevant investigative agency, each corresponding data model indicating a corresponding data set required by the investigative agency for a suspicious activity report (SAR) based on the case information;

for each of the relevant investigative agencies, validating that all of the corresponding data set is included in the case information based on the corresponding data model;

for each of the relevant investigative agencies, filing a SAR with the investigative agency based on the case information in correspondence with the access token;

for each of the relevant investigative agencies, determining at least one search strategy based on the case information by parsing the case information based on the corresponding data model of the jurisdiction and configuring preset search strings based on the parsing; and transmitting a message to each of the relevant investigative agencies, the message including a link to a secure browser, the secure browser corresponding to the case information and being preconfigured with the preset search strings to thereby permit the investigative agency to conduct auditable internet searches, based on the at least one search strategy that are not associated with computing devices of investigative agency.

18. The computer-readable storage medium of claim 17, wherein the method further comprises includes a secure URL in at least one of the SARs, the secure URL providing the investigative agency with access to the additional information corresponding to the case information.

19. The computer-readable storage medium of claim 17, wherein each retrieved data model is based on reporting specifications of the corresponding investigative agency and wherein validating further comprises returning a validation issues message when validation cannot be completed due to missing or incorrect information, receiving corrected information, and attempting validation of the corrected information.

20. The computer-readable storage medium of claim 18, wherein the additional information includes at least one of data visualizations, maps, analysis tools, case data supporting documents, and/or communication tools that enable personnel at the investigative agency to send and receive messages a compliance professional who prepared the SAR.

21. The computer-readable storage medium of claim 18, wherein each secure URL is unique to the corresponding SAR.

22. The computer-readable storage medium of claim 21, wherein each secure URL has controls that include at least one of authentication that the user of the URL is personnel at the investigative agency, a time-based expiration, and/or access permissions to only desired IP addresses.

23. The computer-readable storage medium of claim 17, wherein an access token is required to make requests to the API and the access token expires at a predetermined time.

24. The computer-readable storage medium of claim 17, wherein the secure browser is configured to run on a virtual machine.

\* \* \* \* \*